July 19, 1966  F. R. WHITTEN  3,261,402
FORMATION TESTING APPARATUS
Original Filed July 13, 1964  2 Sheets-Sheet 2

Frank R. Whitten
INVENTOR.

BY *[signature]*
ATTORNEY

United States Patent Office 3,261,402
Patented July 19, 1966

3,261,402
FORMATION TESTING APPARATUS
Frank R. Whitten, Houston, Tex., assignor to Schlumberger Well Surveying Corporation, Houston, Tex., a corporation of Texas
Continuation of application Ser. No. 384,024, July 13, 1964. This application Sept. 13, 1965, Ser. No. 492,975
13 Claims. (Cl. 166—63)

The application is a continuation of my copending application Serial No. 384,024, filed July 13, 1964, now abandoned, which latter application was a continuation of another copending application of mine, Serial No. 184,826, filed April 3, 1962, also now abandoned. This invention relates to new and improved formation testing apparatus and, more particularly, to test apparatus for obtaining a fluid sample from earth formations traversed by a bore.

Heretofore, one type of formation testing apparatus for use in medium to hard (consolidated) formations has employed a single pack-off shoe with a sealing member which is driven into engagement with the sidewall of a borehole, the sealing member having a relatively large borehole wall-engaging surface designed to isolate a portion of the formation from the usual drilling fluid in the borehole. Perforating means in the apparatus opens the isolated portion of the formation to permit fluids from the formation to flow via the perforator port to a sample-receiving chamber. After a desired amount of fluid is obtained, the sample-receiving chamber is closed, the shoe and sealing member retracted and the apparatus withdrawn from the borehole so that the sample may be measured and analyzed. Apparatus of this type is more completely described in Patents No. 3,011,554 and No. 2,674,313.

For use in a very soft or unconsolidated formation, a formation tester apparatus is used wherein a snorkel or fluid-sampling tube is forced into the formations through a sealing member so that the fluid sample flows through the tube to the sample-receiving chamber, the tube minimizing the effect of formation erosion. Apparatus of this type is more completely described in Patent No. 2,965,176.

Another type of formation testing apparatus is disclosed in my aforementioned application Serial No. 833,356 filed August 12, 1959, now Patent No. 3,104,712, which was copending with the aforementioned application Serial No. 184,826. This type of testing apparatus has longitudinally spaced sealing members for sampling an interval of earth formations and is useful in medium to hard formations or cased holes. In this apparatus, shaped charges produce spaced perforations from which fluid flow is deposited in a sample-receiving chamber.

Where the character (e.g., consolidation, permeability, etc.) of the formations to be sampled is known, there is no particular problem in selecting a particular type of testing apparatus to perform a test. However, if the character of the formations is unknown or in doubt, whether or not a sample is obtained is dependent upon a chance selection of the operator. That is, if the formations are soft, a snorkel tester will work where other testers using shaped charges fail to seal or, conversely, where the formations are hard, a tester using shaped charges will work where a snorkel tester would fail to get a sample from the formations.

Accordingly, it is an object of the present invention to provide new and improved fluid-testing apparatus for reliably obtaining a fluid sample from earth formations independent of their consolidation and permeability characteristics.

In accordance with the present invention, fluid-testing apparatus is provided with longitudinally spaced sample-admitting means on a well tool movable into sealing engagement with the wall of a well bore. While sealing engagement with the well bore is maintained, a test probe or sampling tube is arranged to be forced into the formations through one of the sample-admitting means and opened to the sample-receiving chamber in the tool body. If the formations are soft and permeable, a fluid sample will be recovered; if they are hard and permeable, a fluid sample may or may not be recovered depending upon the degree of permeability and presence of mudcake or other plug in the formations. However, if the formations have low permeability or are blocked near the surface of the bore as is possible on hard formations, there will be no fluid flow. The occurrence of fluid flow is monitored by pressure measurements indicated at the earth's surface. If no flow occurs, either the sampling tube is plugged, or the formations have low permeability or the formations are effectively blocked to prevent fluid flow.

The other sample-admitting means is then opened by a shaped charge which produces a penetration in the earth formations and couples the sample-admitting means to the sample-receiving chamber in the tool. If the pressure measurements indicate a fluid flow, then the formation is permeable and the sampling tube was plugged. If there is no fluid flow, the formation is assumed to have a low permeability.

The novel features of the present invention are set forth in the appended claims. The present invention, both as to its organization and manner of operation together with further objects and advantages thereof may best be understood by way of illustration and example when taken in conjunction with the accompanying drawings in which:

FIG. 3 is a cut-away view partially in cross section of the testing section of FIG. 1.

Figure 1:
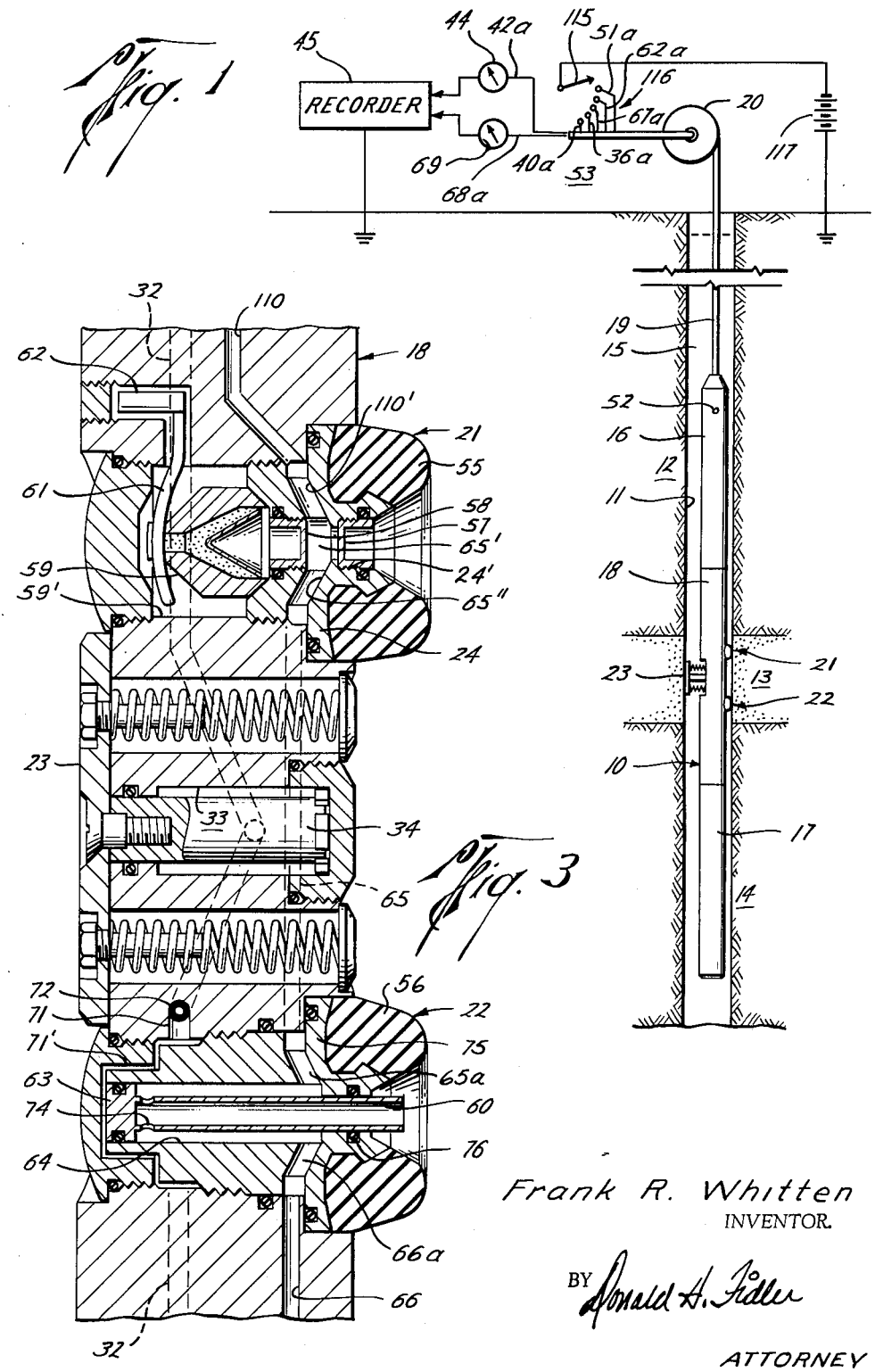
FIG. 1 is a diagrammatic view in elevation of a fluid-sampling apparatus embodying the present invention and shown disposed in a borehole.

In FIG. 1 of the drawings, a formation testing apparatus 10 is shown disposed in a bore 11 traversing earth formations 12, 13, 14 where the formation 13 is the one of interest from which a fluid sample is to be obtained. Bore 11 contains a fluid 15 to provide a hydrostatic control pressure for the well in a conventional manner. Apparatus 10 embodying the present invention is suspended in a bore 11 by a cable 19 connected to a winch 20 located at the surface of the earth, the winch and cable serving to lower and raise the apparatus in a customary manner.

The formation testing apparatus 10 generally comprises upper and lower pressure resistant housing sections 16 and 17 connected together in longitudinally spaced relation by a testing section 18. Upper section 16 generally contains hydraulic motive means for the testing section while lower section 17 generally contains the sample-receiving means. The testing section 18 is provided with spaced fluid sample-admitting means 21, 22 extending outwardly from the section and disposed along the length of the section so as to lie in a central plane extending longitudinally of the testing section. Diametrically opposed from the sample-admitting means 21, 22 is a wall-engaging member 23 mounted so as to move between a retracted position and an extended position.

In the extended position of the wall-engaging member 23 shown, the fluid-sampling means 21, 22 are in sealing engagement with the wall of the bore 11. In this position, a sampling tube (FIGS. 2 and 3) in the sampling means 22 is urged into the earth formations and the occurrence or non-occurrence of fluid flow noted from the surface-indicated pressure measurements. If flow occurs, the sample is obtained in a normal manner and the tool retrieved from the well bore. However, if no flow occurs, perforating means such as a shaped charge associated with the sample-admitting means 21, is employed to perforate the formations thereby providing access from the earth formations to the testing section 18 and a fluid flow if the formations are permeable.

Figure 2:
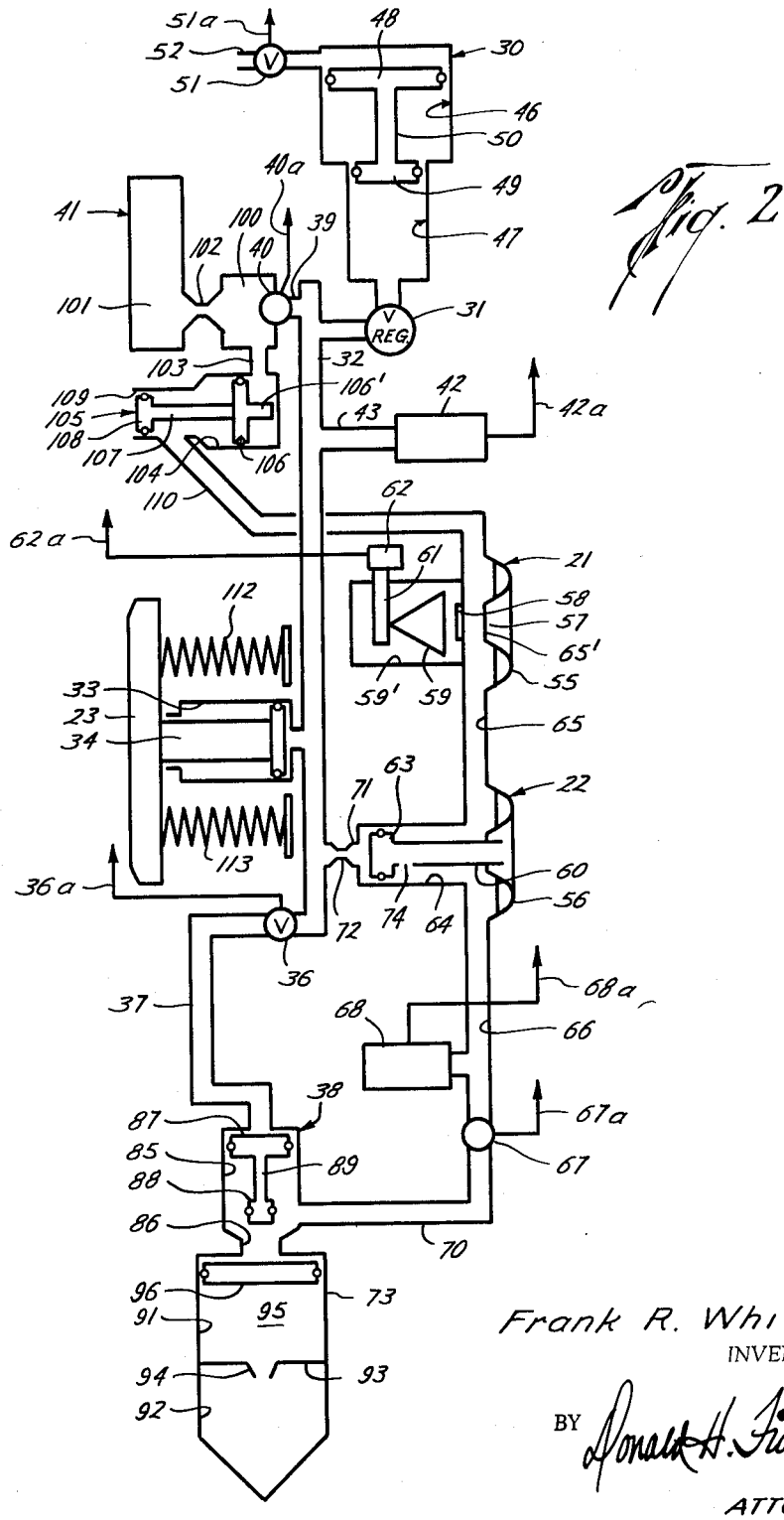
FIG. 2 is a diagrammatic illustration of the operational portions of the fluid-sampling apparatus, which are arranged for lowering in a well.

Referring now to FIG. 2, the operational components of the apparatus 10 are diagrammatically illustrated to show more clearly the over-all relationship and operation of the various components of the apparatus. Detailed features of certain components of the testing section 18 are shown in FIG. 3.

In the first step of operation, the sample-admitting means 21, 22 are placed in sealing engagement with the bore wall. To attain the sealing engagement, the wall-engaging member or backup shoe 23 is moved relative to testing section 18 by means of a hydraulic system which includes a hydraulic pressure means 30 (FIG. 2) connected through a pressure-regulating valve 31 to a high pressure conduit 32, the conduit 32 opening into a cylinder 33 in the testing section 18. A piston 34 is slidably and sealingly received in cylinder 33 and has an end portion secured to the wall-engaging member 23 so that, when the pressure means 30 is actuated, the piston 34 travels outwardly from the testing section 18 by virtue of hydraulic pressure applied to the fluid medium in the hydraulic system. The wall-engaging member 23 upon engaging the bore wall permits the pressure on piston 34 to urge sampling means 21, 22 into sealing engagement along the length of the bore wall.

Conduit 32 at its lower end is blocked by a normally closed break-valve 36 which, when open, serves to couple the high-pressure conduit 32 through another conduit 37 to a seal valve 38. This function will be more fully explained in the description to follow in the proper sequence of operation.

It is, of course, also necessary to provide for reduction of the hydraulic pressure when it is desired to retract the wall-engaging member 23 and this will be more fully explained in the description to follow, it being sufficient to note that the upper end portion of conduit 32 has an extension 39 leading to a normally closed break-valve 40, the valve 40 blocking the conduit 32 from a dump chamber 41.

To provide indications of the pressure of the hydraulic system, a pressure transducer 42 is connected by a conduit extension 43 to the conduit 32. Transducer 42 is adapted to produce electrical signals in response to pressure changes and a conductor 42a connected to the transducer 42 passes through the cable 19 to conventional indicating means 44 (FIG. 1) and a conventional recorder 45 which provides indications of the pressure of the hydraulic system.

Of the foregoing portions of the described apparatus, pressure means 30, regulating valve 31, dump chamber 41, break-valve 40 and transducer 42 are located in upper housing 16 (FIG. 1) of the apparatus 10. By way of general explanation, it will be noted (FIG. 2) that pressure means 30 includes upper and lower cylinders 46, 47 of different diameters which respectively slidably and sealingly receive upper and lower pistons 48, 49, the pistons being interconnected by a longitudinally extending rigid member 50. Upper cylinder 46 is connected to a normally closed break-valve 51 which has an opening 52 to the exterior of the housing section 16 (FIG. 1) so that, when actuated, bore fluid may enter the upper end portion of cylinder 46 via valve means 51. Valve 51, which will subsequently be more fully explained, is adapted to be actuated by electrical energy supplied via a conductor 51a which passes through the cable 19 to surface control equipment 53 (FIG. 1). Thus, when bore fluid 15 under hydrostatic fluid pressure enters cylinder 46, piston 48 moves downwardly so that the interconnected piston 49 in cylinder 47 also moves downwardly thereby compressing fluid in the hydraulic system. Because of the smaller diameter of piston 49 and cylinder 47, the pressure means 30 acts as a pressure multiplier thereby increasing the pressure in the cylinder 47 to a greater value than the hydrostatic pressure. Regulator valve 31 in conduit 32 functions to limit the pressure in conduit 32 to a predetermined value regardless of the hydrostatic pressure in the well thereby preventing pressures in excess of the pressure rating of the system.

In the testing section 18, are the sampling means 21, 22 which include annular sealing pads 55, 56 constructed of elastic material.

Sampling means 21 includes shaped charge explosive means 59 disposed in the rear of a chamber 59' in the testing section 18 and supported therein by a tubular member 24 extending from the forward end of the chamber. The sealing pad 55 is coaxially mounted around the forward end of the tubular member 24. Thin-walled closure members 57, 58 are mounted at spaced intervals within the bore 24' of tubular member 24 and define therebetween a passageway 65'. The forward closure member 57 provides a flow-blocking device for passageway 65' normally closing the sealing pad 55 from fluid flow therethrough; and the rearward closure member 58 closes the chamber 59' and rear portion of bore 24' from passageway 65'. Short transverse passages 65" and 110' through the tubular member 24 provide fluid communication from passageway 65' respectively to conduits 65 and 110 in the testing section 18.

Shaped charge 59 is connected to igniter means such as a primacord 61 and a blasting cap 62, the blasting cap being ignitable upon receipt of electrical energy from the control equipment 53 (FIG. 1) via a conductor 62a in cable 19. Hence, it may be appreciated that when the sealing pads 55, 56 are in sealing engagement with the bore wall and the shaped charge 59 is detonated, a perforation will be produced in adjacent earth formations thereby permitting formation fluids to flow, if present, through the perforated wall portions of closure 57 into the passageway 65'.

Sampling means 22 includes a thin-wall tube member 60 mounted centrally of the sealing pad 56 for transverse movement into earth formations. Tube 60 is preferably constructed of frangible, non-porous material. The tube 60, at its rearward end has a piston portion 63 slidably and sealingly received in a cylinder 64. A passageway 71 couples the end of the cylinder 64 to the high-pressure conduit 32 and has a flow choke 72 therein. When the pressure in conduit 32 is increased to place the sampling means 21, 22 in sealing engagement with the well bore, the choke 72 delays operation of the tube and piston until after the sampling means 21, 22 are sealed to the bore wall. Then the pressure in conduit 32 is applied to the piston 63 to urge the forward end of the tube 60 into the earth formations. The tube 60 has a rearward opening 74 placing its interior in fluid communication with the cylinder 64.

As shown in FIG. 3, cylinder 64 is formed in a cap member 75 and the tube 60 slides through a seal 76 at the forward end of the cap member. Passageways 65a, 66a are provided in the cap member 75 for communication between cylinder 64 and passages 65, 66, respectively. Cap member 75 is sealed in the body and provided with clearance 71' to provide fluid communication for conduit 32 and permit fluid pressure to be applied to piston 63.

The cylinder 64 is connected via passageways 65a for fluid communication to the sample-admitting means 21 by means of a conduit 65 and passageway 65" in cap 24 (FIG. 3). The cylinder 64 is also connected via passageway 66a by a conduit 66 to a normally closed break-valve 67. Valve 67 is provided with an electrical conductor 67a extending through the cable 19 to the surface control means 53. Also connected to the conduit 66 between the cylinder 64 and valve 67 is a pressure transducer 68 which corresponds in construction to transducer 42 and serves to derive indications of the pressure in the conduit 66 which in turn provides pressure information about the fluids in the earth formations. Transducer 68 is similarly connected by a conductor 68a to indicating means 69 (FIG. 1) at the surface of the earth and also to the recorder 45. Thus, it will be appreciated that when the valve 67 (FIG. 2) is opened to permit fluid flow, such flow if it occurs will be at a pressure dependent upon the fluids in the formations and is sensed by the pressure transducer 68 and recorded by the surface-indicating equipment.

Valve 67, when opened, connects conduit 66 via a conduit 70 to the seal valve 38. Seal valve 38 opens into a sample-receiving device 73. Hence, when valve 67 is opened, formation fluids may flow via conduit 70 and seal valve 38 to the sample-receiving device, 73. Of course, the pressure of the flowing sample fluids may be continuously sensed by the pressure transducer 68 and recorded.

Seal valve 38 generally includes upper and lower cylinders 85, 86 which are adapted to respectively receive an upper sealed piston 87 and a lower sealed valve head 88, the piston 87 and head 88 being interconnected by a rigid member 89. In the normal position of the seal valve 38, the piston 87 is in an upward position in cylinder 85 so that the valve head 88 is not blocking cylinder 86 thus permitting a fluid sample to flow between conduit 70 and the sample-receiving device 73. To operate the seal valve 38 to close off the sample-receiving device 73, the upper end of cylinder 85 is connected by conduit 37 to the normally closed valve 36 in the high-pressure conduit 32. Valve 36 has a conductor 36a extending through cable 19 to the surface control means 53. Thus, when valve 36 is opened, high pressure is applied to piston 87 moving it downward so that piston 88 enters cylinder 86 and is locked in place by locking means (not shown) to seal off the opening to the sample-receiving device 73 thereby preventing further fluid flow into or out of the device. Locking means, for example, can be of the type illustrated in Patent No. 3,011,554.

Sample-receiving device 73 generally includes upper and lower chambers 91, 92 separated by a partition 93 having a flow-restricting orifice 94. A fluid 95 such as water is disposed in the upper chamber 91 and separated from the cylinder 86 by a floating piston 96 which is initially positioned in the upper end of the chamber 91. Lower chamber 92 is filled with air, the piston 96 being held in position by frictional forces of piston sealing means such as O rings. Hence, formation fluids entering cylinder 86 move piston 96 downwardly at a rate determined by the flow of fluid 95 through orifice 94.

After a sample has been obtained, to retrieve the apparatus 10, it is necessary to disengage the wall-engaging member 23 and sealing pads 55, 56 from the bore. Dump valve 40 is provided with a conductor 40a extending through cable 19 to the surface control means 53 and when dump valve 40 is actuated by the surface control means 53, the fluid in the hydraulic system is permitted to flow into dump chamber 41. Chamber 41 is constructed with a sufficient volume to receive the hydraulic fluid of the pressure system and is at atmospheric pressure thereby to reduce to a small value the pressure on the fluid in the system. Dump chamber 41 includes a first chamber 100 and a second chamber 101 which are interconnected by a flow-restricting orifice 102. First chamber 100 is connected by a conduit 103 to the rearward end of a cylinder 104 of a pressure-equalizing valve 105. A piston 106 is slidably and sealingly received in cylinder 104 and spaced from an end wall of the cylinder by an extension 106'. Another piston 108 of smaller diameter is slidably and sealingly received in a bore 109 and has an extension 107 in abutment with piston 106. Bore 109 extends between cylinder 104 and the exterior of the testing section so that the bore fluid 15 acts upon the piston 108 to urge it inwardly toward cylinder 104, the piston 108 preventing bore fluid from entering bore 109.

A channel 110 extends between bore 109 and the passageway 65' of the sampling means 21. When dump valve 40 is opened the orifice 102 momentarily restricts the relief of the pressure and permits a surge of pressure to be applied to piston 106 to move it to the left so that piston 108 is moved out of bore 109. Extension 107 of piston 108 is of lesser diameter than piston 108 to permit bore fluid to flow into channel 110. In the just-described position, means (not shown) are provided to retain the piston in its open position. Thus, in the open position of piston 108, bore fluid 15 is permitted to enter cylinder 109 and pass through channel 110 to the passageway 65' and cylinder 64 of the sample-receiving means 21, 22 and the pressure across the sealing pads 55, 56 (if both are open) is equalized to facilitate removal of the sealing pads from the bore wall. Also, the hydrostatic mud pressure acts on the piston 63 in the cylinder 64 to retract it.

When the hydraulic pressure in conduit 32 is reduced due to fluid flow into dump chamber 41, the pressure of the well fluid on piston 34 becomes greater than the pressure of the pressure of the hydraulic system on piston 34 and movement of piston 34 serves to urge the wall-engaging member 23 toward a retracted position. To facilitate the retraction of member 23 should it stick to the wall of the bore, heavy springs 112, 113 are connected between the member 23 and testing section, the springs being tensioned in the extended position of the member 23 so that the force of the springs tends to move member 23 inwardly toward a retracted position.

Referring now to FIG. 1, the surface control apparatus 53 includes a movable contact arm 115 for a multicontact switch 116, the contacts of which are connected, in counterclockwise fashion, to conductors 51a, 62a, 67a, 36a and 40a which correspond to the conductors in the apparatus 10 as previously described. Contact arm 115 is connected to a source of electrical energy 117 whereby the various electrical circuits in the apparatus may be supplied with electrical power.

In operation, the apparatus 10 is lowered in the bore 11 to the level to be tested by means of the cable 19 and winch 20 as shown in FIG. 1. Movable arm contact 115 is then moved counterclockwise to supply electrical energy via conductor 51a to actuate the valve 51 (FIG. 2) in housing section 16. Thus, valve 51 is opened thereby permitting bore fluid 15 to actuate the pressure means 30 and produce amplified hydraulic pressure for the hydraulic system. The pressure of the fluid in the hydraulic system is regulated by regulating valve 31 and applied via conduit 32 to the cylinder 33 containing piston 34 which moves the wall-engaging member 23 relative to the testing section 18 until the pad members 55, 56 of the fluid-sampling means 21, 22 sealingly engage the wall of the bore. It will be noted that dump valve 40 and valve 36 associated with conduit 32 are normally closed.

As the sealing pads 55, 56 of the fluid-sampling means 21, 22 move into sealing engagement with the bore wall 11, the pressure in the hydraulic system increases to the maximum value of the hydraulic system thereby further compressing sealing pads 55, 56. The pressure of the hydraulic system is sensed by the pressure-responsive means 42 and recorded. As soon as the pad members 55, 56 are sealed on the bore wall, the pressure applied via passageway 71 to the piston 63 urges the tube 60 into the formations.

Operation for permeable formations

At this time, if the formation is permeable and fluid will flow, the pressure of the formation fluids is built up in the testing section 18 and is sensed by the pressure-responsive means 68 to provide an indication of the initial pressure characteristic of the formation fluids over a period of time.

Next, the conductor 67a is connected to the source of electrical energy 117 to open valve 67 thereby permitting the fluid to flow into the sample-receiving device 73 via conduit 70 and seal valve 38. As the sample chamber 91 receives the formation fluids, the floating piston 96 is moved downwardly thereby displacing the cushioning fluid 95 below it through orifice 94 into the lower chamber 92.

After a suitable time has elapsed to obtain the fluid sample, the source of electrical energy 117 is connected to conductor 36a to open valve 36. Valve 36 couples the pressure of the hydraulic system to the seal valve 38 so that the piston 87 of the seal valve means is actuated moving the piston 88 into the bore 86 thereby closing the sample-receiving chamber 73. If the sample chamber 73 fills up, a final pressure reading will be obtained before closing the seal valve, however, in the event the chamber 91 does not fill up in a certain length of time, the closing of the seal valve 38 permits a final pressure reading of the formation to be obtained by the transducer 68.

Thereafter, the source of electrical energy 117 is connected to conductor 40a and the dump valve 40 is actuated to reduce the hydraulic pressure of the system. The orifice 102 retards the reduction of pressure so that a surge of hydraulic pressure is applied to the pressure-equalizing valve 105 via conduit 103 to move the pistons 106 and 108 to the left thereby unblocking bore 109 and permitting bore fluid 15 to enter conduit 110 to the sample-receiving means 21 and 22. Thus, the pressure-equalizing valve 105 permits the pressures across the seal pad 56 to be equalized. At the same time the hydrostatic pressure acts on the piston 63 to retract it from the earth formations. The pressure of the bore fluid 15 is also sensed by the pressure-responsive means 68.

As the pressure of the hydraulic system decreases, the pressure of the bore fluid 15 urges member 23 towards a retracted position, this movement being assisted by springs 112 and 113 which are tensioned in the extended position of member 23. When member 23 is completely retracted, apparatus 10 is retreived from the bore and the collected sample analyzed.

Should the tube 60 fail to retract, its frangible construction will permit breaking of the tube so the apparatus is not stuck in the well bore.

*Operation for impermeable formations*

If there is no fluid flow, this is indicated by the response of pressure-responsive means 68. Then the conductor 62a is connected to the source of electrical energy 117 to detonate the shaped charge device 59. The perforating jet from the shaped charge 59 opens closure members 58, 57 and penetrates the earth formations to place the sample-admitting means 21 in fluid communication (via passageway 65) with the sample-receiving chamber 73. If the formations are hard but permeable, the perforation will permit fluid flow. If the formations have low permeability, no fluid will flow. Fluid flow, if it occurs, will be to the sample-receiving device 73 and the fluid sample will be obtained as above described. The tool is then retracted and retrieved as described heretofore.

What is claimed is:

1. A fluid-testing tool comprising: a body adapted to be lowered through a well bore extending through earth formations; longitudinally spaced sample-admitting means on one side of said body and including sealing means about each of said sample-admitting means adapted to be urged into sealing engagement with a well bore; means in said tool for placing said sealing means into sealing engagement with a well bore, one of said sample-admitting means including flow-sampling means mounted for transverse movement through said sealing means into earth formations when said sealing means are in sealing engagement with a well bore; and hydraulic means for urging said sampling means into earth formations, the other of said sample-admitting means being normally closed to fluid flow from the well bore and including selectively operable perforating means for selectively opening said other sample-admitting means through said sealing means.

2. A fluid testing tool comprising: a body adapted to be lowered through a well bore extending through earth formations; longitudinally spaced sample-admitting means on one side of said body and including elastomeric, ring-like sealing elements adapted to be urged into sealing engagement with a well bore; means in said tool for placing said sample-admitting means into sealing engagement with a well bore, one of said sample-admitting means including flow-sampling means mounted for transverse movement through one of said ring-like elements into earth formations when said sample-admitting means are in sealing engagement with a well bore; and hydraulic means for urging said sampling means into earth formations, the other of said sample-admitting means being normally closed to fluid flow from the well bore and including selectively operable perforating means for selectively opening said other sample-admitting means through the central portion of the corresponding ring-like element.

3. The apparatus of claim 2 and further including a common sample-chamber means connected to said sample-admitting means.

4. The apparatus of claim 3 and further including means to sense the pressure of fluid flow into said sample-admitting means.

5. A fluid-testing tool comprising: a body adapted to be lowered through a well bore extending through earth formations; spaced sample-admitting means on said body including resilient sealing members; means coupled to said body to urge said sealing members into sealing engagement with a well bore; a fluid-sampling tube mounted in said body centrally of one of said sealing members for transverse movement into earth formations, said sampling tube including a piston portion; hydraulic means in said body cooperating with said piston portion of said fluid-sampling tube for moving it into earth formations; a sample-receiving chamber in said body; means providing a fluid conduit between said sampling tube and said sample-receiving chamber; and means for selectively providing a fluid connection between the other sealing member and said fluid conduit means including a flow-blocking device normally closing off said other sealing member from the well bore and also including perforating means in said body disposed centrally of the said other sealing member, said perforating means, upon firing, serving to open said flow-blocking device in said other sealing member and also penetrate the earth formations.

6. A fluid-testing tool comprising: a body adapted to be lowered through a well bore extending through earth formations and containing a fluid; longitudinally spaced sample-admitting means on said body including resilient sealing members; means coupled to said body to urge said sealing members into sealing engagement with a well bore; a fluid-sampling tube having a piston mounted in a cylinder in said body centrally of one of said sealing members for transverse movement into earth formations; hydraulic means in said body operable on said piston for moving said fluid-sampling tube into earth formations; a sample-receiving chamber in said body; means providing a fluid conduit between said sampling tube and said sample-receiving chamber; and means for selectively providing a fluid connection between the other sealing member and said fluid conduit means including a flow-blocking device normally closing off said other sealing member from the well bore, and shaped charge means in said body disposed centrally of said other sealing member, said shaped charge means, upon detonation, serving to open said flow-blocking device and penetrate the earth formations.

7. The apparatus of claim 6 wherein said sampling tube is constructed of a frangible, non-porous material.

8. The apparatus of claim 6 wherein said means to urge said sealing means into sealing engagement with a well bore includes hydraulic actuating means; means coupling said hydraulic means to said hydraulic actuating means including a pressure-delay device to permit said sealing members to be placed in sealing engagement with a well bore before said hydraulic means are operable.

9. The apparatus of claim 8 wherein said hydraulic actuating means includes pressure-multiplying means responsive to the hydrostatic pressure of the fluid in the well bore.

10. A sub-assembly for a well-testing unit comprising: a body having longitudinally spaced, elastomeric, ring-like sealing members on one side of said body; a fluid-sampling tube mounted in said body centrally of one of said sealing members for transverse movement; means on said sampling tube adapting it for response to hydraulic pressure; means for selectively providing a fluid connection between said sealing members including a flow-blocking device normally closing off a central portion of the other sealing member from the well bore, perforating means in said body disposed centrally of said other sealing member; means for sealing off said perforating means from contact with fluid, said perforating means, upon firing, serving to open said sealing-off means and said flow-blocking device.

11. The apparatus of claim 10 wherein said blocking device includes frangible means and said perforating means is a shaped charge.

12. The apparatus of claim 10 wherein said sampling tube is constructed of frangible, non-porous material.

13. In a well tool, a support body, elastomer sealing means having a central opening, means in said central opening coupling said sealing means to said support body, said coupling means having a central passageway, said support body having a chamber aligned with said central passageway of said coupling means, shaped charge means in said chamber for producing a perforating jet to pass through said passageway, transverse passage means opening to said central passage and adapted to receive a fluid, frangible closure means in said central passageway and closing said central passageway to either side of said transverse passage means, and means for admitting fluid to said transverse passage means at a pressure related to the pressure of fluids in a well bore.

References Cited by the Examiner
UNITED STATES PATENTS

| | | | |
|---|---|---|---|
| 2,612,346 | 9/1952 | Nelson | 166—100 X |
| 2,640,542 | 6/1953 | Brown et al. | 166—100 X |
| 2,688,369 | 9/1954 | Broyles | 166—100 |
| 2,821,256 | 1/1958 | Boller | 166—100 |
| 2,904,113 | 9/1959 | McMahan | 166—100 |
| 2,905,247 | 9/1959 | Vestermark | 166—100 |
| 2,965,176 | 12/1960 | Brieger et al. | 166—100 |
| 3,010,517 | 11/1961 | Lanman | 166—100 |
| 3,079,793 | 3/1963 | LeBus et al. | 166—100 X |
| 3,174,547 | 3/1965 | Fields | 166—55.1 |

CHARLES E. O'CONNELL, *Primary Examiner.*

D. H. BROWN, *Assistant Examiner.*